United States Patent
Lynch

(10) Patent No.: US 7,089,576 B1
(45) Date of Patent: *Aug. 8, 2006

(54) RATINGS CONTROL SYSTEM WITH TEMPORARY OVERRIDE CAPABILITY AND CONFLICT RESOLUTION FEATURE

(75) Inventor: David Johnston Lynch, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 09/475,447

(22) Filed: Dec. 30, 1999

(51) Int. Cl.
*H04N 7/16* (2006.01)

(52) U.S. Cl. .................... 725/25; 725/27; 725/28; 725/29

(58) Field of Classification Search ............ 725/25–30, 725/31
See application file for complete search history.

(56) References Cited

U.S. PATENT DOCUMENTS

| | | | | |
|---|---|---|---|---|
| 4,528,589 A | | 7/1985 | Block et al. ............ | 358/122 |
| 4,750,213 A | | 6/1988 | Novak .................... | 455/67 |
| 4,930,158 A | * | 5/1990 | Vogel ..................... | 386/94 |
| 4,930,160 A | * | 5/1990 | Vogel ..................... | 725/30 |
| 5,168,372 A | * | 12/1992 | Sweetser ................ | 725/29 |
| 5,231,661 A | | 7/1993 | Harnum et al. ......... | 380/7 |
| 5,382,983 A | * | 1/1995 | Kwoh et al. ............ | 348/716 |
| 5,465,113 A | * | 11/1995 | Gilboy ................... | 725/29 |
| 5,550,575 A | * | 8/1996 | West et al. ............. | 725/28 |
| 5,828,402 A | * | 10/1998 | Collings ................. | 725/28 |
| 5,969,748 A | * | 10/1999 | Casement et al. ...... | 725/27 |
| 5,973,683 A | * | 10/1999 | Cragun et al. .......... | 345/719 |
| 5,995,133 A | * | 11/1999 | Kim ....................... | 725/28 |
| 6,020,882 A | * | 2/2000 | Kinghorn et al. ....... | 345/716 |
| 6,025,869 A | * | 2/2000 | Stas et al. .............. | 725/28 |
| 6,100,916 A | * | 8/2000 | August et al. .......... | 725/28 |
| 6,115,057 A | * | 9/2000 | Kwoh et al. ............ | 725/28 |
| 6,125,259 A | * | 9/2000 | Perlman ................. | 725/28 |
| 6,137,486 A | * | 10/2000 | Yoshida et al. ......... | 345/719 |
| 6,212,679 B1 | * | 4/2001 | Vornsand ............... | 725/25 |
| 6,226,793 B1 | * | 5/2001 | Kwoh .................... | 725/28 |
| 6,230,320 B1 | * | 5/2001 | Gakumura .............. | 725/25 |
| 6,359,661 B1 | * | 3/2002 | Nickum .................. | 348/734 |
| 6,481,009 B1 | * | 11/2002 | Miyakoshi .............. | 725/28 |
| 6,505,348 B1 | * | 1/2003 | Knowles et al. ........ | 725/49 |
| 2002/0013941 A1 | * | 1/2002 | Ward, III et al. | |

FOREIGN PATENT DOCUMENTS

| | | |
|---|---|---|
| EP | 0893920 A2 | 1/1999 |
| WO | WO96/06501 | 2/1996 |
| WO | WO97/49245 | 12/1997 |
| WO | WO98/52357 | 11/1998 |
| WO | WO99/4361 | 9/1999 |

OTHER PUBLICATIONS

International Search Report of Apr. 12, 2001.

* cited by examiner

*Primary Examiner*—Scott Beliveau
(74) *Attorney, Agent, or Firm*—Joseph J. Laks; Robert D. Shedd

(57) ABSTRACT

Video processing system having a blocking system which prevents viewing or recording of programs which exceed ratings, spending, and/or view time limits set by a supervisor who has entered a password accepted by the control system, an override system for entering instructions to temporarily override ratings, spending, and/or view time limits, and/or to permit specific programs to be viewed, and a conflict resolution system for resolving conflicts between or among multiple instructions. Related apparatus and processor are also disclosed.

14 Claims, 3 Drawing Sheets

Override List Screen

| Channel | System | Program Info | Start Time | Stop Time | Status |
|---------|--------|--------------|------------|-----------|--------|
| 101 | Sat 1 | Sit Com | 10:00 am 1/2/99 | 11:00 am 1/2/99 | Active |
| 107 | Sat 2 | News 2 | 1:00 pm 2/2/99 | 2:30 pm 2/2/99 | Paused |
| ALL | ALL | | 1:00 pm 4/2/99 | 2:30 pm 4/2/99 | Running |
| 200 | Sat 1 | Movie XXX | 1:00 pm 2/2/99 | 2:30 pm 2/2/99 | Running |
| 200 | Sat 1 | Movie 2 | 2:00 pm 2/2/99 | 4:00 pm 2/2/99 | Running |
| 404.50 | Cable | Movie 3 | 1:15 pm 2/2/99 | 4:00 pm 2/2/99 | Running |
| ... | ... | ... | ... | ... | ... |

| Override Parameters |
|---|
| 1) Rating Override: R  Content Advisory: R |
| 2) Spending Override: $10.00 |
| 3) View Time Override: Unlimited |
| 4) Channel List Override: Yes |
| 5) Profile Override Applies: Child |

Status Modifier Buttons:

| Activate | Pause | Delete |
|----------|-------|--------|

CURRENT OVERRIDE MODE: MOST RESTRICTIVE

FIG. 3

RATINGS CONTROL SYSTEM WITH TEMPORARY OVERRIDE CAPABILITY AND CONFLICT RESOLUTION FEATURE

BACKGROUND

This invention relates to systems for blocking viewing or recording of television programs which exceed a ratings, spending, or viewing time limit, or other viewing limit set by a supervisor.

Video signal processing systems such as television tuners contained in television sets, video cassette recorders, or cable boxes which are suitable for coupling to a display device such as a picture tube and which contain circuitry and software designed to prevent viewing of programs containing ratings information below a level set by a supervisor or exceeding spending limits in pay-per-view systems, are very well known. The programmed processor allows a supervisor with a password, usually a parent, to set a limit over or outside of which supervised persons, such as young children, cannot view broadcasts.

A device or system that provides such control permits a supervisor to prevent certain programs and/or scenes from being viewed and heard based on the content of the program/scenes, the subscription cost, or total viewing time for a period such as a day. For example, a parent might specify that programs and/or scenes including violent subject matter should be excluded. A supervisor can also specify a rating limit, such as PG-13, and programs and scenes exceeding that limit (e.g., R and X rated programs) could not be viewed or heard. The supervisor can also limit the use of pay-per-view or can set a pay-per-view spending limit The supervisor can also enter a daily maximum view time. The ratings, spending and view time can be chosen in a profile, which may also include the name of the user, or an identification such as "children." In some situations, one or more profiles can be defined, for example a second profile for "parents," and a third for "babysitter." Each profile may have a different ratings limit, pay-per-view spending limit, and view time limit, and can only be accessed by the person specified in the profile, i.e., the children can not apply the parent profile since it is protected by a password.

By decoding program content information included in an auxiliary information component of a program signal (e.g., Extended Data Services (XDS) data in an NTSC television signal in the United States or PSIP data in an ATSC television signal), a television receiver containing a "stripper" (or decoder) can "slice" or extract information (e.g., from the vertical blanking interval (VBI) of an NTSC television signal in the United States) to determine the content and rating of television programs and scenes and can compare the content and rating to the limits set by the supervisor. Other data such as spending data or time limits may be received in other ways, for example using the system clock to calculate elapsed active view time.

When the ratings information or other information for a program exceeds a limit set by the supervisor, the processor is designed to blank the screen and mute the audio portion of the broadcast. For television receivers which also have multi-image display capability, the receiver would provide supervisor control for both main and auxiliary pictures when both are displayed. In addition, the receiver may display a message indicating the reason for the interrupted reception and the expected duration of the interruption (e.g., SCENE EXCEEDS CONTENT LIMIT).

In situations where the supervisor wishes to temporarily change the ratings limit, time limit, or spending limit, or to permit viewing of a particular television broadcast, the supervisor must reset the ratings limit, and then remember to restore the original limit. Due to the inconvenience of having to reset the original limit, we have conceived of a system for temporarily overriding the normal limits, as disclosed in a copending patent application entitled RATINGS CONTROL SYSTEM WITH TEMPORARY OVERRIDE CAPABILITY, Ser. No. 09/475,448 filed on even date herewith, hereafter referred to as "Override Invention." Our aforementioned Override Invention provides a video signal processing system such as a television receiver, cable box, or VCR tuner for producing an output signal suitable for coupling to a display device to produce a displayed image, which blocks viewing of programs which are received with embedded ratings information, spending information, and/or view time which is outside a range selected by a supervisor, and permits the supervisor to enter a temporarily revised range or permit specific programs to be viewed; the system then automatically restores the normal limits at the end of the temporary override.

While the Override Invention provides several ways for a supervisor to override the normal viewing limitations, for example by a modified ratings limit for a defined temporary period; an override for a single broadcast program; an override for a specific time period on a regular basis; an override to allow spending to exceed the normal limit for a particular day; and an override to allow the supervised person to view television for a different time limit, it is herein recognized that choosing more than one override option may present conflicts for the system. The present invention addresses that problem.

SUMMARY OF THE INVENTION

The present invention comprises a video signal processing system for producing an output signal suitable for coupling to a display device to produce a displayed image, having a supervisor control system which permits the supervisor to enter ratings, spending, or view time limits and thereby block viewing of any programs which exceed those limits, and also to temporarily override such limits to permit specific programs to be viewed, to make a temporary change in the ratings limit, to temporarily revise a spending limit, and/or to temporarily revise a view time limit. The system permits viewing of programs within the time duration and parameters of the temporarily revised limits, and automatically restores the normal ratings, spending, and/or view time limits at the completion of the overrides. When there are more than one active override entered in the system, this invention resolves conflicts among such overrides by following either the most restrictive or the least restrictive of the conflicting overrides, depending on either supervisor choice or system default.

As with the Override Invention, children and others who do not have the supervisory password can not change the profiles or temporarily override blocking; and the supervisor who has entered the password accepted by the control system can enter the override system and enter (A) one or more specific broadcast programs to be unblocked, (B) one or more channels to be unblocked for one or more specific time periods, (C) a revised ratings profile for a specific time period, (D) a revised spending, and/or (E) a revised view time limit. The override limits are preferably displayed on a list of active overrides, as with the Override Invention. The list of overrides is available for on screen viewing until the time period is complete. The time period for the override is set by the supervisor, or is derived by the processor from the time a particular program is scheduled to be broadcast.

Preferably the processor is programmed to display a status listing of programs or channels unblocked and the corresponding time periods, or to display the status of the remaining spending authorization for a profile.

According to the present invention, the system default may be preset by the manufacturer to resolve conflicting override instructions by following the most restrictive instruction or the least restrictive instruction. It is preferred, however, to provide a menu option which allows the supervisor to choose to change the conflict resolution default to follow either the least restrictive or most restrictive of the conflicting override instructions.

In another aspect, the invention comprises a ratings control system which blocks programs which are broadcast with ratings information or spending information which is outside a range selected by a supervisor, and which permits a supervisor to enter a password and select a program, channel and time period, and/or overall time period for which the normal ratings control range or spending limit is temporarily revised, which automatically restores the normal ratings control range at the expiration of the selected time period(s) or completion of the selected program(s), and which resolves conflicts between multiple override instructions by following a preset conflict resolution mode of either the most restrictive or least override instruction. Preferably the supervisor can change the conflict resolution mode by toggling between the two modes, i.e., most restrictive or least restrictive.

Another aspect of the invention comprises a processor which normally blocks viewing of programs or recordings outside limits entered by a supervisor, which permits or denies viewing of programs according to temporary override(s) instructions entered by the supervisor, which returns to normal blocking profile after expiration of a time period set by the supervisor, or by removal of the override(s) by the supervisor, or after completion of the programs or recordings permitted in the temporary override(s) instructions, and which resolves two or more conflicting override instructions according to a preset mode of either the most restrictive or the least restrictive override.

It is preferred to present an on-screen guide in the user interface which lists all active overrides. In the case of conflicting overrides, the on screen guide could either indicate a conflict, or automatically resolve any conflict and not display the override which is not being followed.

BRIEF DESCRIPTION OF THE DRAWINGS

FIG. 3 shows an example of an on-screen display of an override menu including the multiple override conflict resolution feature.

DETAILED DESCRIPTION OF THE INVENTION

The invention will be illustrated with respect to a preferred embodiment of the invention, but the invention should not be construed as limited thereto. For example, a television receiver will be illustrated, but the invention is also applicable to other types of video processing systems such as those with display devices such as television sets, and to those without display devices such as direct broadcast satellite (DBS) signal receivers and video recorders (VCRs). In general, the invention applies to systems, apparatus and devices which employ ratings control or spending limits or other criteria to permit or deny access to video or audio broadcasts or recordings.

Figure 1:
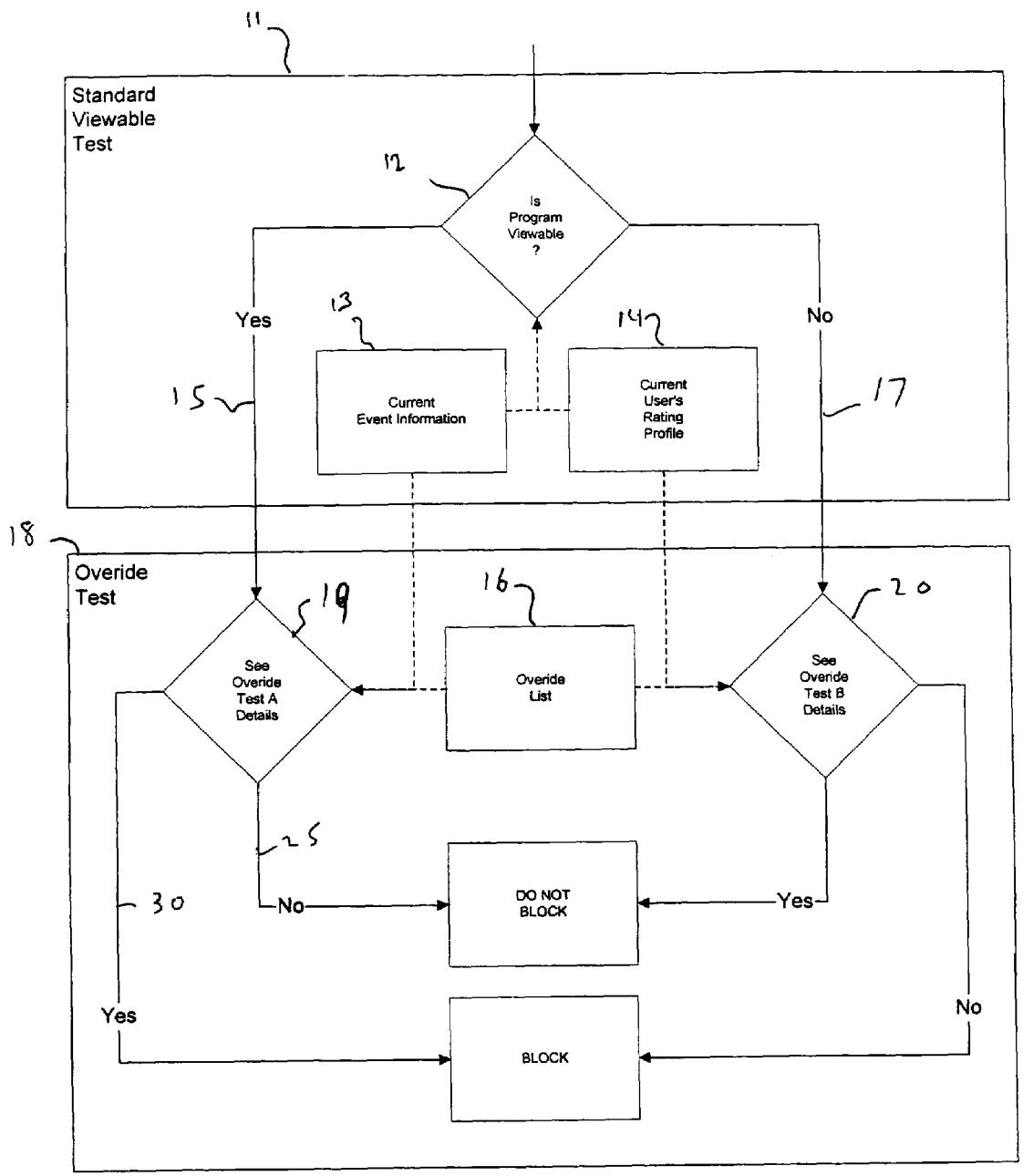
FIG. 1 shows, in block diagram form, a preferred system of the invention disclosed in the above-mentioned copending patent application bearing Ser. No. 09/475,448, upon which the present invention is based.

As shown in the block diagram in FIG. 1 wherein a profile is active in the system, the standard viewable test 11 is run by the processor 12 to determine initially if the program is viewable 15 or not viewable 17. The processor receives both current event information 13 and the current user's rating profile 14 which has previously been entered by the supervisor.

In an example of how an override conflict might arise, if the supervisor of the system who has the password wants to allow a certain one hour program to be viewed by the child but the program's rating is above the allowed limit, the supervisor selects "override" and is challenged to enter the correct password to enter an override in the override list 16. The supervisor identifies the program, the start and stop time, and the profile in cases where the system allows alternative profiles. In this example the supervisor also wants to override the normal view time to temporarily permit up to three hours of viewing on weekdays, and so the supervisor enters a menu selection via the on-screen display and overrides the view time. In this example of a conflict, the viewer has already used up 2½ hours of the 3 hours view time override when the specially permitted one hour program is about to be broadcast. The system is now presented with a conflict between allowing the one hour program and the half hour of remaining view-time per the view time override.

Figure 2:
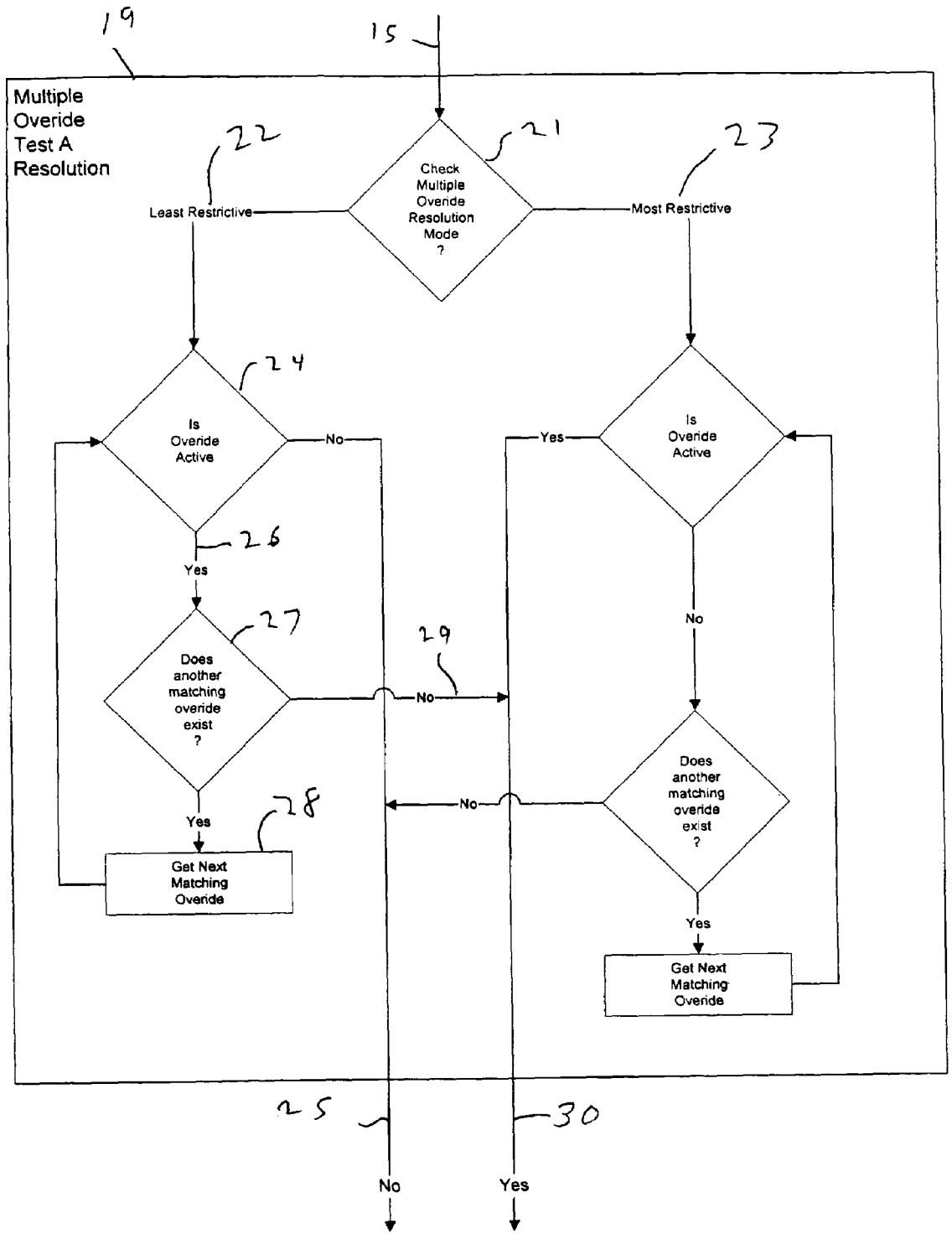
FIG. 2 shows, in block diagram form, the override list conflict resolution logic.

Referring to FIG. 1, the override test logic 18 illustrated is programmed to use information in the override list 16 and apply override list 16 and apply override test A 19 if the standard limits test 11 would permit 15 viewing, or override test B 20 if the normal limits test 11 would not permit 17 viewing. Override test A is illustrated in FIG. 2. Within test A and test B are multiple override conflict resolution routines illustrated in FIG. 2 wherein the system processor 21 first checks which mode is active, i.e., either the least restrictive 22 or most restrictive 23.

Assuming the least restrictive mode is active, either by system default or by supervisor choice, the system logic first checks whether an override is active 24. If no, then no blocking is imposed 25. If yes 26, then the system then checks for another matching override 27 and, if any, then "gets" it 28, or if not 29 then permits 30 the program.

Referring now to FIG. 3, an example of a screen displayed at the command of a supervisor who has entered an accepted password contains a list of programs being broadcast at a particular time, listing channel, system, program info, start time, stop time, and status. "Active" refers to programs being currently viewed, "running" refers to programs which are specifically permitted, and "paused" refers to programs which are specifically denied. The "override parameters" list contains the currently imposed limits with regard to "rating," "content advisory," "view time," "channel list," and "profile." By using a remote controller, the supervisor can move the cursor to any of the parameters and change them, for example by using the "channel up" and "channel down" keys on the remote controller. The "current override mode" feature is illustrated as "most restrictive," meaning that in the event of a conflict between two or more different override parameters as applied to a specific program, the system is set to impose the most restrictive one, i.e., the one which would deny viewing and not follow the override which would permit viewing. The "current override mode" may be toggled by the supervisor to "least restrictive," which would result in the system permitting viewing of a program which is within any of the override parameters.

While this invention has been illustrated and explained in sufficient detail so that those skilled in this art can readily make and use it, various alternatives, modifications, and improvements which are within the scope and spirit of the invention should become apparent.

The invention claimed is:

1. A method for selectably controlling viewing and recording of television programs, the method comprising the steps of:
    establishing at least one viewer profile for blocking images from a corresponding viewer based on limits selected from the group comprising: program ratings, spending, channel, view time limits, time of day limits, image content ratings;
    creating at least one override list including override instructions applicable to said at least one viewer profile for modifying selected ones of said limits;
    detecting the existence of a conflict between override instructions; and
    automatically resolving conflicts between conflicting override instructions upon detecting the existence of a conflict when said override instruction are enabled.

2. A method for controlling viewing of video images comprising the steps of:
    coupling video processing circuitry to a display device so as to provide video images for display to at least one viewer;
    providing parental control circuitry for blocking at least a portion of said video images from being displayed to a viewer in accordance with a corresponding viewer profile;
    creating at least one override list comprising override instructions applicable to said video processing circuitry so as to unblock selected blocked video images;
    detecting the existence of a conflict between override instructions; and
    automatically resolving conflicts between said override instructions upon detecting the existence of a conflict when said set of limits are enabled.

3. The method of claim 2 wherein the step of resolving conflicts includes the steps of:
    determining the least restrictive of conflicting override instructions; and
    applying said least restrictive override instruction to said viewer profile so as to unblock at least a portion of said video images.

4. A system for selectably controlling viewing and recording of television programs, the system comprising:
    at least one viewer profile establishing a set of limits for blocking images outside said limits from view;
    at least one limit selected from the group comprising: program ratings, spending, channel, view time limits, time of day limits, image content ratings;
    at least one override list including at least one override instruction applicable to said at least one viewer profile for overriding at least one of said limits; and
    a conflict resolver for detecting the existence of a conflict between override instructions and automatically resolving conflicts between said override instructions upon detecting the existence of a conflict when said set of limits are enabled.

5. The system of claim 4 wherein said conflict resolver is switchable between a most restrictive mode of operation and a least restrictive mode of operation.

6. The system of claim 4 including means to display to a viewer a blocking status of at least one image.

7. The system of claim 4 including at least one apparatus selected from the group comprising: television receiver, cable box, video cassette recorder (VCR) tuner.

8. A system for selectably controlling viewing and recording of television programs, the system comprising:
    at least one viewer profile establishing a set of limits for blocking images outside said limits from view of a corresponding viewer, said limits selected from the list including: program ratings, spending, channel, view time limits, time of day limits, image content ratings;
    at least one override list including override instructions applicable to said at least one viewer profile for modifying at least one of said limits;
    a conflict resolver for detecting the existence of a conflict between override instructions and automatically resolving conflicts between said override instructions upon detecting the existence of a conflict when said set of limits are enabled.

9. The system of claim 8 wherein said conflict resolver is switchable between a least restrictive mode of operation and a most restrictive mode of operation, wherein the least restrictive of conflicting override instructions is applied to said viewer profile when said conflict resolver is in said first mode of operation and the most restrictive of conflicting override instructions is applied to said viewer profile when said conflict resolver is in said second mode of operation.

10. The system of claim 8 wherein said images blocked from view in accordance with said profile are selected from the group comprising: programs, channels, program rating, scene ratings, spending limits, time limits and time period.

11. The system of claim 8 wherein said images unblocked in accordance with said override list are selected from the group comprising: programs, channels, program rating, scene ratings, spending limits, time limits and time period.

12. A system comprising:
    a video signal processing apparatus for producing an output signal suitable for coupling to a display device to produce images for viewing or recording;
    a blocking system coupled to said video signal processing apparatus which blocks said images in accordance with a profile set by a supervisor, said blocking system including:
    at least one override list applicable to said profile such that images blocked in accordance with said profile are unblocked in accordance with said override list; and
    a conflict resolver for detecting the existence of a conflict between override instructions and automatically resolving conflicts between two or more of said override lists upon detecting the existence of a conflict.

13. The system of claim 12 wherein said conflict resolver includes at least first and second conflict resolution modes.

14. The system of claim 13 wherein said first conflict resolution mode is a least restrictive mode and said second conflict resolution mode is a most restrictive conflict resolution mode.

* * * * *